United States Patent [19]
Short et al.
[11] 3,829,627
[45] Aug. 13, 1974

[54] AUTOMATIC LINE INSULATION ROUTINER

[75] Inventors: Thomas D. Short; Donald R. Marcum, both of Jackson, Tenn.

[73] Assignee: International Telephone and Telegraph Coropration, New York, N.Y.

[22] Filed: Dec. 18, 1972

[21] Appl. No.: 316,134

[52] U.S. Cl. .......... 179/175.2 R
[51] Int. Cl. .......... H04m 3/30
[58] Field of Search...... 179/175.2 R, 175.11, 175.3

[56] References Cited

UNITED STATES PATENTS

| | | | |
|---|---|---|---|
| 1,632,048 | 6/1927 | Van De Walter et al. | 179/175.11 |
| 1,855,852 | 4/1932 | Freesland | 179/175.2 R |
| 2,632,817 | 3/1953 | Kessler | 179/175.2 R |
| 2,721,910 | 10/1955 | Avery | 179/175.2 R |

OTHER PUBLICATIONS

"Adding Line Insulating Routining . . . " by G. M. Seyan GTE Automatic Electric Technical Journal, 10-72, 209-216.

"Automatic Line Insulation Test . . . " Burns et al., Bell Telephone System Technical Publ. 2-9-53.

*Primary Examiner*—Kathleen H. Claffy
*Assistant Examiner*—Douglas W. Olms
*Attorney, Agent, or Firm*—J. B. Raden; M. M. Chaban

[57] ABSTRACT

Disclosed is a testing apparatus for automatically routining or testing the lines in a conventional telephone exchange under the control of a small or medium size computer. Lines are tested consecutively by equipment locations with four lines being selected for test at one time. The address of the lines to be tested is sent to a test connector which seizes a test relay associated with the lines to be tested to initiate testing. A series of error checks and verification checks are incorporated into the test procedures to discontinue testing on the sensing of conditions of a serious nature while providing an out put or alarm signal. On sensing conditions of lesser significance, testing is continued with a notation being made of the number of gross errors of the less serious condition. The apparatus, as disclosed, could readily be used for traffic testing of the exchange lines.

9 Claims, 10 Drawing Figures

POWER CONTROL CIRCUIT 300

PATENTED AUG 13 1974 3,829,627

SHEET 07 OF 10

PATENTED AUG 13 1974

3,829,627

SHEET 08 OF 10

AUTOMATIC LINE INSULATION ROUTINER

BACKGROUND OF THE INVENTION

Routining of the lines of telephone exchanges is an old and well-established art. Originally, such tests were manually initiated and conducted by a wired program. Later, systems were triggered automatically and a wired program was again used to control the selection and testing of lines. In some instances, simulation techniques were employed to perform testing under the control of a processor such as shown in U.S. Pat. No. 3,692,961 to LeStrat, issued Sept. 19, 1972 for Telephone Call Simulator.

The actual testing of the lines has been performed in many ways such as transistor sensors, magnetic coupling and the like.

SUMMARY OF THE INVENTION

The present invention relates to an automatic line tester for a telecommunications exchange which has a line circuit for each line in the exchange. A test access relay in the line unit, which is provided on the basis of one test access relay per four lines, is energized for the test. A test is made for leakage to ground, leakage to battery and leakage between conductors of each of the four lines in test. The test results are fed to a differential amplifier which compares sensed voltage against a standard. A sensing relay responds to a fault condition to transmit an indication of the fault back to the computer.

To select lines for testing, a test controller is operated by the computer to select lines for test and to complete the connection to the lines to be tested through a test connector. The marker or wired program controller involved in normal call selection of a line is checked to minimize interference with normal calls being set before test. Each test access relay for the lines to be tested is checked for seizure, and an indication of the successful seizure is returned to the computer. Testing is then initiated. The test condition sensed is fed through a differential amplifier detection unit and the results of the detection are fed from this unit back to the computer as four bits of information. Verification tests are initiated automatically on the occurence of trouble indications.

It is, therefore, an object of the invention to provide a new and improved automatic line test network for telecommunications exchanges.

It is a further object of the invention to provide a line test unit which tests a plurality of lines at one time under the control of a general purpose computer and which returns the results of the test to the computer.

It is a further object of the invention to provide a computer controlled automatic line test apparatus for testing the lines of an electromechancial crossbar exchange for leakage to ground, battery leakage and between-conductor leakage.

It is a still further object of the invention to provide a testing arrangement employing a stored program data processor to control the transmission and receipt of information to and from lines to be tested.

Other features, objects and advantages of the invention will become apparent from the following description taken in conjunction with the drawings, a brief description of which follows.

DETAILED DESCRIPTION OF THE DRAWINGS

Figure 1:
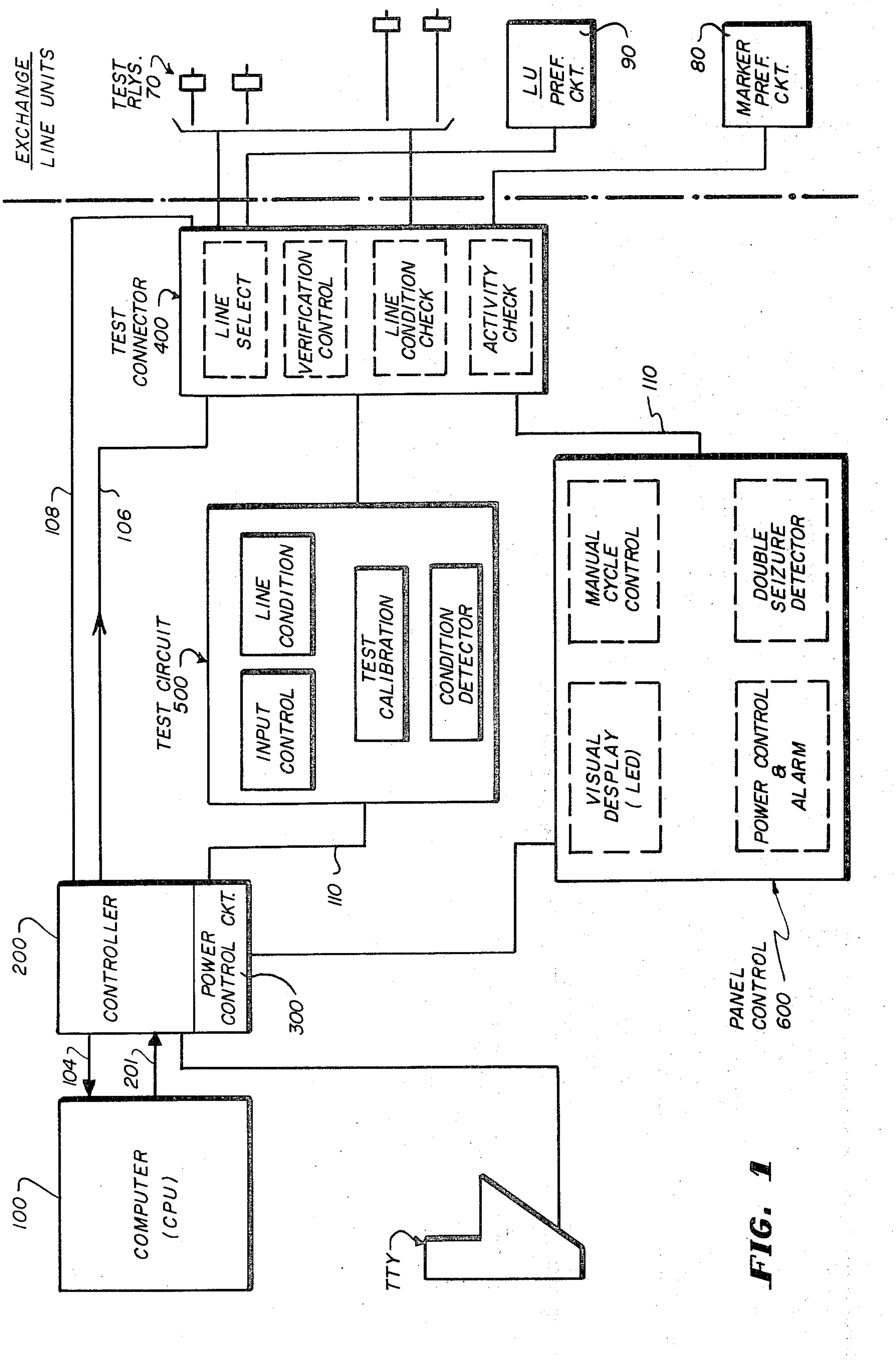
FIG. 1 is a schematic block diagram of the circuit for the apparatus.

In FIG. 1 we show a block diagram of our test apparatus, the functioning of which is directed by the computer or central processing unit designated CPU–100. The CPU used is a 16-bit parallel machine which accepts an eight bit byte. A machine capable of use as the CPU herein is the computer manufactured by the Digital Equipment Corp., under the trade name "PDP–11." One or more teletype machines, designated TTY, are also provided to initiate various system functions as desired, and to produce printed read out of the test results.

The apparatus, as shown, is designed for testing a crossbar exchange of the type shown generally in U.S. Pat. No. 3,441,677 for Automatic Switching Matrix, issued Apr. 29, 1969, and assigned to the assignee hereof. In such a system, generally known and sold in the U.S. under the title "A–1 Crossbar System," the line circuit for each line includes a test relay 70 not used in normal completion of a call, but which is set aside for test functions. The exchange also includes a plurality of marker circuits connected to line circuit for processing a call, and preference circuits 80 and 90 for both marker and line circuits.

The computer 100 provides signal information to a test controller 200. The test controller converts the signals to a form applicable for use by a test connector 400 to interface between the controller and the exchange being tested. Once equipment in the exchange is accessed and indicated to be ready for test, a test circuit 500 actually performs the tests.

A control panel 600, including visual display and control switches, is also provided.

The functions of the basic circuits of the apparatus may be summarized as follows:

Central Processor 100

1. Provides control of line selection in a sequential order, for selection of four lines for simultaneous testing.
2. Prints on teletype the address of a line that fails, identifying the line by its matrix location.
3. Provides a test/no test map for lines expected to fail (coin, PBX) to prevent unwanted print-out of information concerning these lines.

4. Provides an interface via teletype for messages of test progress and test results to an operator of the apparatus.
5. Provides an interface for changing and verifying the test/no test map by an apparatus operator via teletype.
6. Provides an interface for setting test conditions under a teletype control by the apparatus operator, conditions such as: (a) first line unit to be tested; (b) last line unit to be tested; (c) test range of resistances; (d) automatic start by timing or the like.
7. Provides the necessary signals for the control panel.
8. Provides self diagnosis of the computer and diagnosis of the controller.

Automatic Line Test Controller 200

1. Provides buffers from the CPU to select:
   a. One out of 15 frame groups (FG), there being fifteen such groups within the exchange;
   b. One out of six line units (LU), there being six such line units within each frame group;
   c. One out of eight switches (SW), there being eight such switches per line unit;
   d. One out of nine test relays (Horiz. level selection), there being nine such relays per switch;
   e. One of the three line tests to be conducted.
2. Provides gating circuits to ensure that each element that can be controlled by the CPU can also be read by the computer.
3. Provides buffers for signals from the connector and from the control panel.
4. Provides an integrity check on the test circuit after testing each frame group by connecting to simulated lines above and below the selected range.
5. Provides the necessary signal to the CPU for sending and receiving 16 bit words.
6. Provides a floating contact for all leads to the relay interface and manual control panel.

Line Test Connector 400

1. Provides a relay buffer from the controller to select one line unit and operate one test relay in that line unit.
2. Provides a check for marker activity in the selected line unit.
3. Provides a check to see that there is no test call in progress and for a no-test call set to the selected line unit.
4. Checks for an idle indication on the sleeve leads of four lines selected from the test relay (Note that four lines are tested simultaneously by the present apparatus).
5. Connects the tip and ring of selected idle lines to the test circuit and ground the sleeve for each such line. Busy lines are not tested.
6. Provides necessary control to the test circuit to pre-condition the lines before each test and to transmit the three tests.
7. Provides the necessary signals to and from the manual control panel.

Test Circuit 500

1. Performs the three tests on each line; i.e. — false ground, foreign potential, and loop leakage.
2. Four essentially identical test detecting circuits are used to test four selected lines simultaneously.
3. Pre-conditions the lines to the potential the test circuit will apply if the line leakage is equal to the selected test limit.
4. Provides seven program selectable test ranges.
   Test range 1 — 15K
   Test range 2 — 25K
   Test range 3 — 50K
   Test range 4 — 100K
   Test range 5 — 250K
   Test range 6 — 500K
   Test range 7 — 1MEG
5. Provides for manual calibration of each of the four test circuits.

Line Test Control Panel 600

1. Provides a visual display of test progress.
2. Allows manual control of test system.
3. Provides calibration indicators for test circuit.

In FIG. 1, we show the test control circuit or controller 200 which receives its input information from the processor over input cable 201, indicating the addresses of the lines to be tested and feeds the address and status information concerning these lines back to the computer over cable 104. The test addresses are also fed from the controller over cable 106 to the test connector 400 to enable the seizure of the selected lines for testing. Status information from the connector is fed back to the controller over cable 108 to provide that status information for the processor.

Once the lines to be tested (four in number) are seized, the test circuit 500 is activated by the controller over cable 110 to initiate the actual testing of the selected lines and to relay the test results to the control panel over cable 110 and to the controler for transmission to the processor.

Figure 2A:
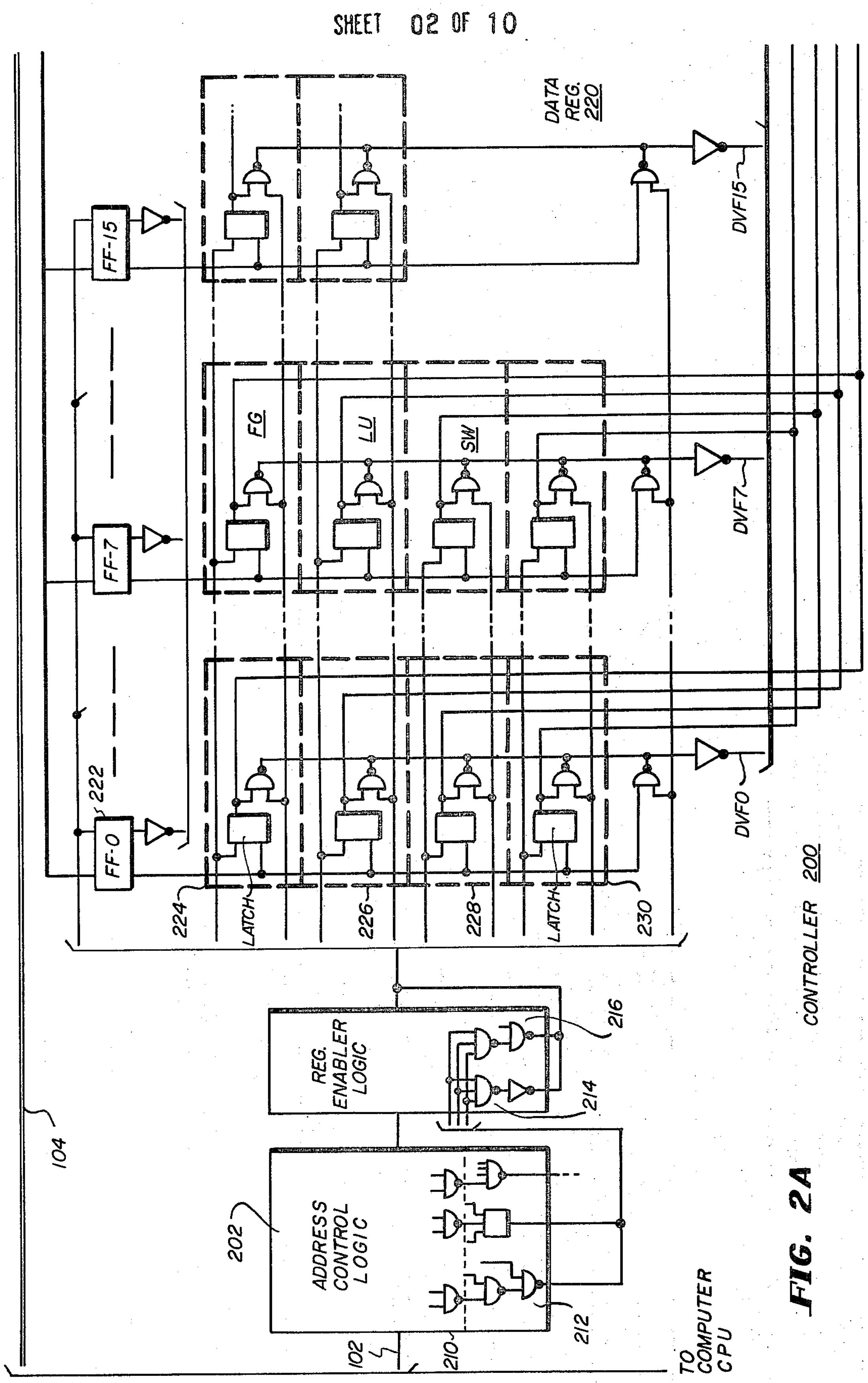
FIGS. 2A and 2B combinedly comprise a schematic circuit diagram, partially in block form, of the controller of FIG. 1, with FIG. 2B positioned to the right of FIG. 2A.
Figure 2B:
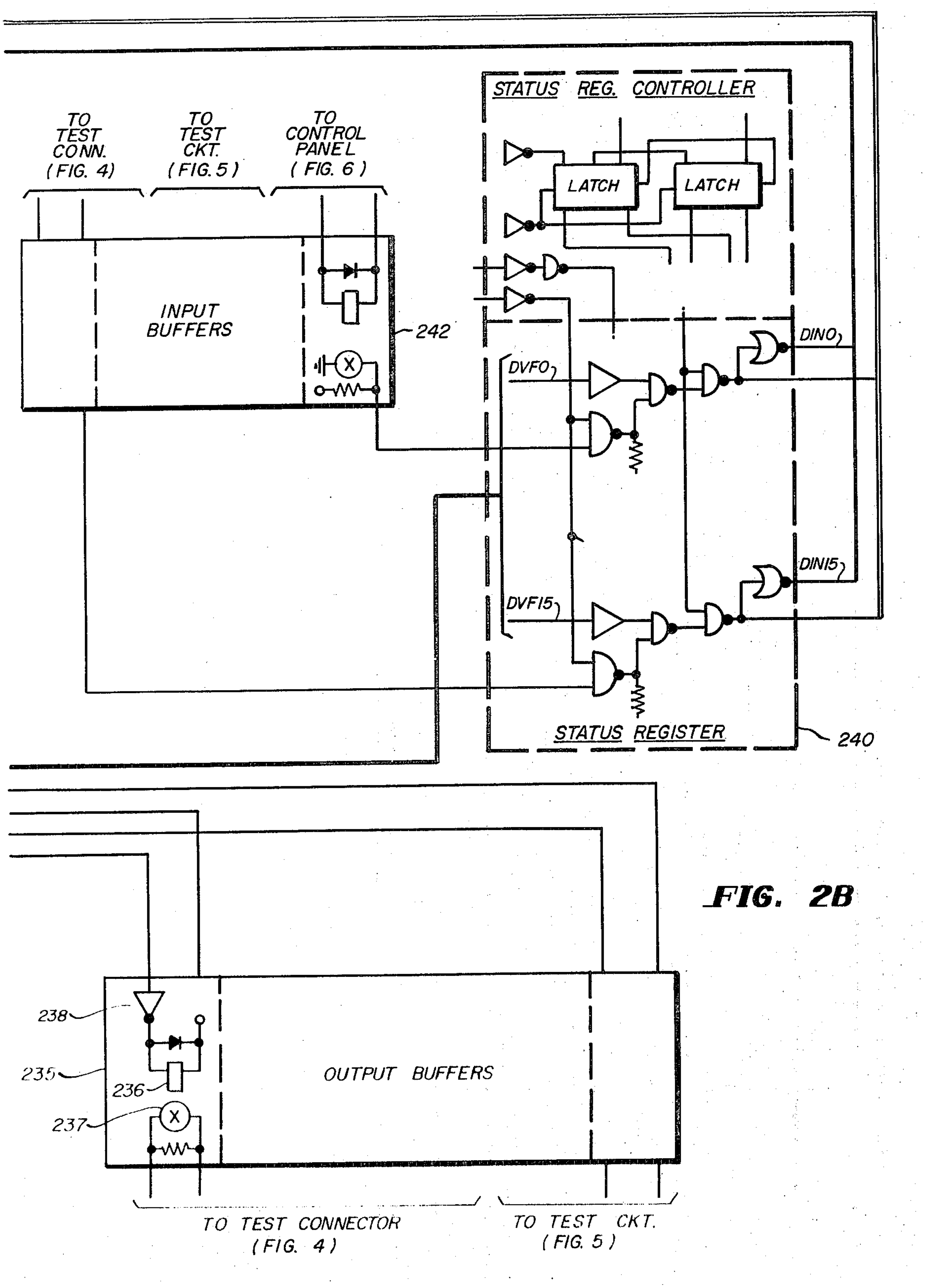

In FIG. 2, we show in greater detail, the controller which receives its input from the CPU, within the circuits indicated as address control logic circuits 202. In circuits 202, the address of the specific register circuit desired for a data transfer is decoded responsive to an indication from the CPU. Within the address control logic, a signal is received on one input of the multiple input 210 to indicate the direction of data transfer, into or out of the CPU. The gating network 212 output is connected to an enabling network 214 comprised of parallel three input NAND gates 216. Outputs of the gating network 212 are multiplied to the inputs of the enabling network 216 to determine which register to enable dependent on the address received from the computer.

The enabling logic triggers a data register 220, the size and makeup of which is dependent on the makeup of the exchange being routined. The specific exchange shown herein has 15 frame groups with six line units in each group. Each line unit contains eight switches and each switch contains nine levels. In addition to the exchange make up the data register contains control points for the insulation test circuit. Data information from the CPU, in the form of logic level pulses, is stored in the clocked flip flops 222. The output of each clocked flip flop has access to several latch circuits 224, the number depending on the bit position in the data register. The data information temporarily stored on the clocked flip flops 222 is transferred to the latch circuits holding registers 224, 226, 228, 230, or 232 for permanent storage. The specific holding register is enabled by the enabling logic 214 which is controlled by the address received by the address control logic 202. Only a representative portion of the register has been shown to provide an understanding of the principle involved in providing the necessary function.

The outputs of the data register are transmitted to out buffer stage 235. This stage includes a plurality of reed relays 236 with mercury wetted sealed contacts 237, each of which is responsive to an enable output latch in the data register to close its contacts and test a line relay within the connector for checking the availability of a test relay in a line circuit of the exchange for testing purposes. A high current gate 238 is located in series with each relay coil.

If the relay being checked for availability is indeed available, an indication is transmitted to the test connector and forwarded to the status register circuit 240 through the input buffer relay stage 242. The input buffer relays of this stage are reed relays similar to those of the output buffer stage and feed the status register 244, which comprises a gating network to return a signal to the computer as to the sensed availability of the test relay in the exchange. The status register is capable of reading the status of thirty-two points, so that additional tests, such as traffic and the like, can be run with the equipment provided.

Figure 3:
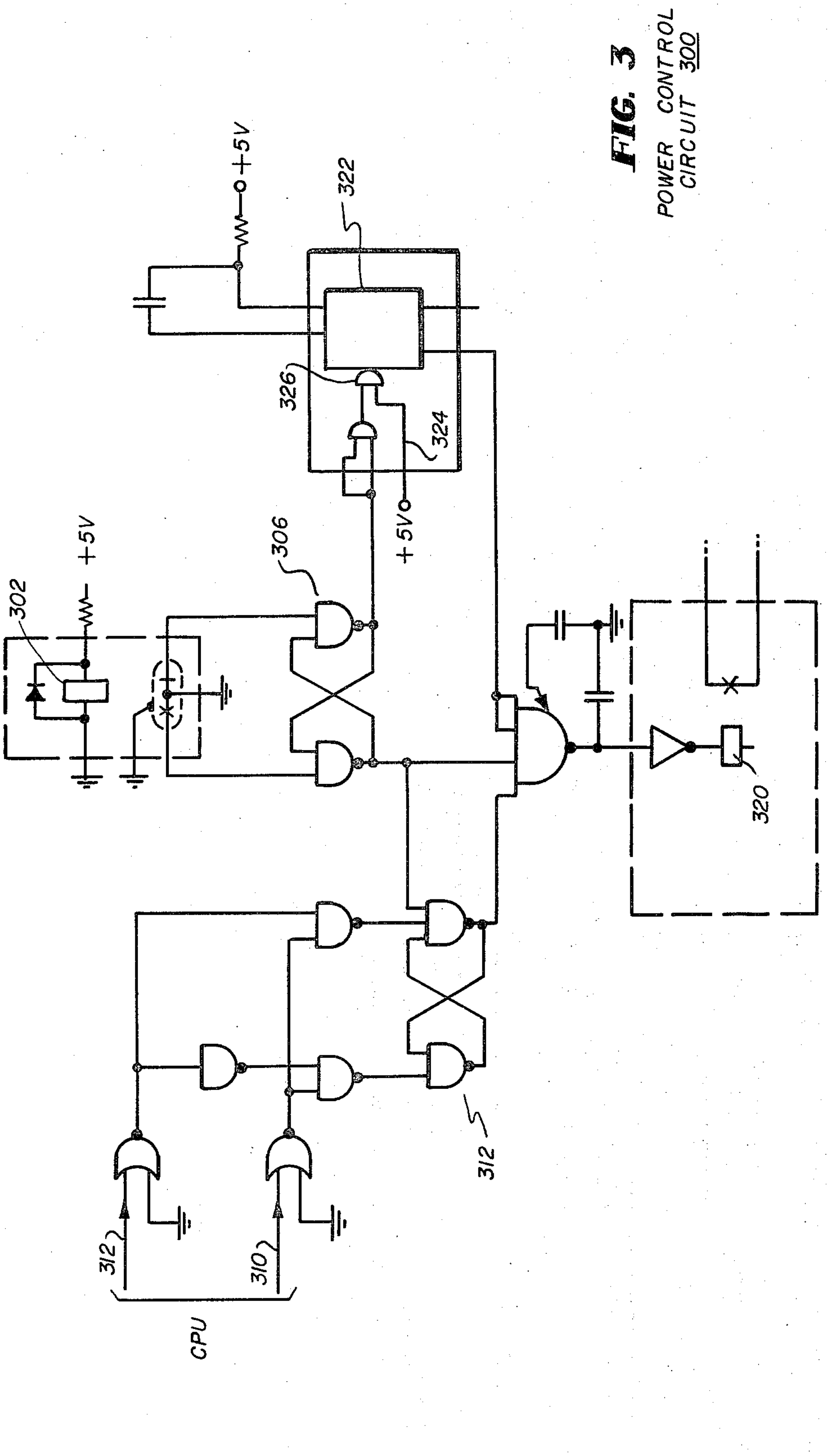
FIG. 3 is a schematic circuit diagram of the Power Control Circuit which may be included in the controller of FIG. 1.

In FIG. 3, we show a power control circuit 300. This control circuit responds to a low power condition at the processor or the controller, the processor being powered from the controller 200. On a low power condition, the CPU and the controller are shut off and a low power indication is sent to the control panel.

On restoration of power, a slow-to-operate relay responds to the power up condition in the controller to delay the placing of the power ground on the computer and delays the removal of the control panel indication.

The slow-to-operate relay 302 is normally operated over ground and battery received from the controller, and acts to ground the computer and enable logic including latch 306. On receipt of power, the computer grounds its lead 310 and pulses lead 312 to enable logic including latch 312.

On failure of power in (1) the controller as indicated by the restoration of relay 302, or (2) the failure of the computer to provide pulses on lead 312 or (3) failure of the unit to properly recycle, the power is removed from the +5V supply, an alarm lamp is lit in the control panel via relay 320, and power is removed from the processor, CPU and teletypewriter TTY.

The +5V volt supply controls logic circuits including flip-flop 322 over a path from lead 324 to an AND gate within the logic network and finally to relay 320 to provide the output indication.

Figure 4A:
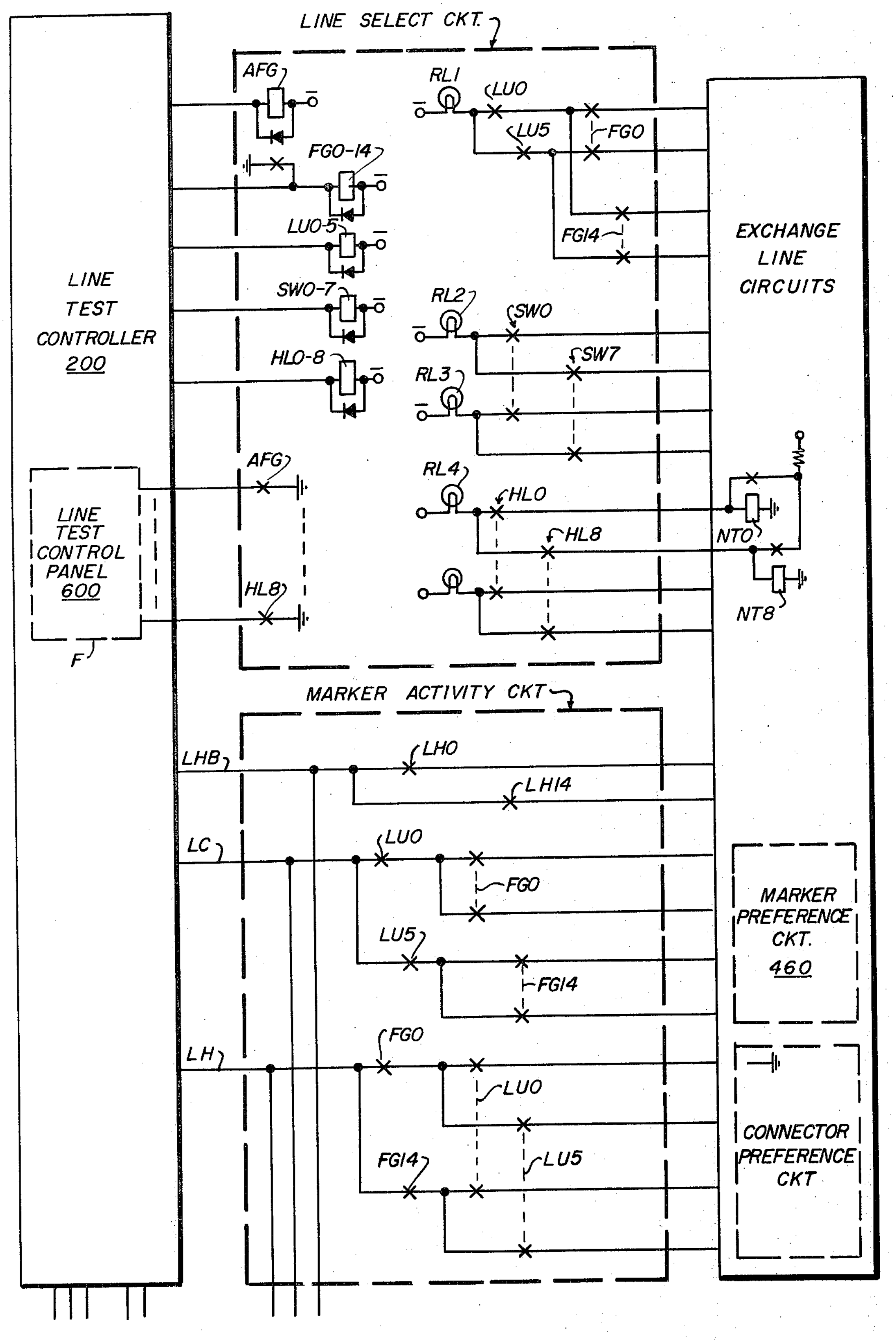
FIGS. 4A and 4B combinedly comprise a schematic circuit diagram of the test connector of FIG. 1 with FIG. 4A positioned above FIG. 4B.
Figure 4B:
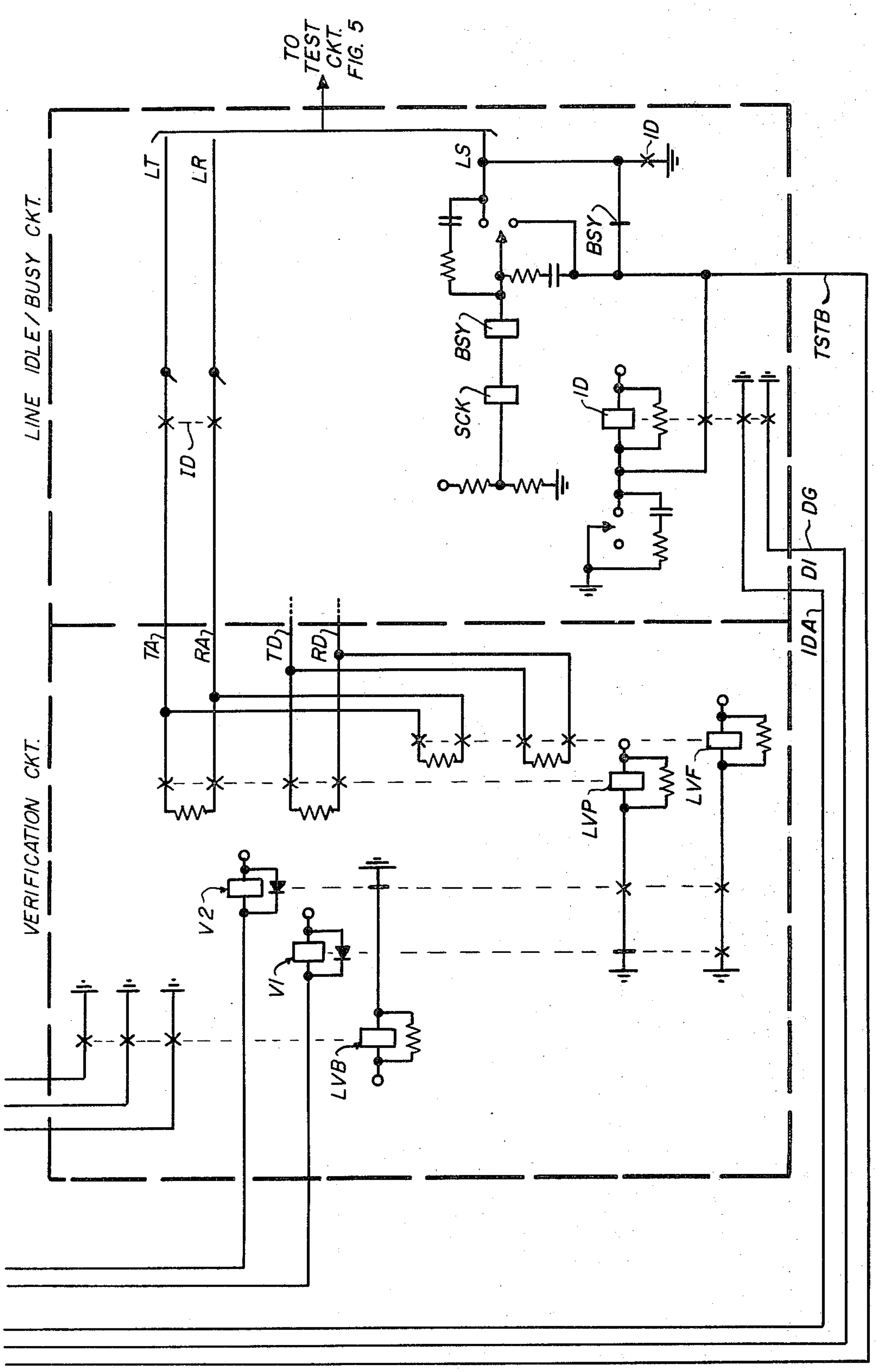

Within the connector 400 shown in detail in FIG. 4 are the relay operated circuits to effect the selection as addressed by the controller. On a selection received from the controller, a test access relay NT in the selected line unit of the exchange is energized. As is well-known, such relays have no function in the normal call procedure. This relay when energized, places battery from its H lead to indicate test use of the line circuit in test.

Selected by the controller through the output buffer contacts is a frame group relay FG, a line unit relay LU, a switch relay SW, a horizontal level relay HL, (only one of each of these is shown). These relays are numbered FG 0–14, LU 0–5, SW 0–7 and HL 0–8 the numbers indicating the quantities of each type of relay and the quantities of the underlying components in the system being tested. From the HL relay contacts, a test access relay in the line circuit of the exchange is seized. This relay serves four successive lines as determined by equipment location designation.

As can be seen in FIG. 4A, operation of an NT or test relay such as NT8 places its operating battery on the H lead. The presence or absence of this battery on the H lead is checked for the selected test relay. A delay is provided following the selective operation of an NT relay to allow for the inherent slow-to-operate nature of the relay and to allow time for checking the proper condition for testing, i.e., absence of resistance battery on the H lead.

Also checked by the connector is the activity of the exchange marker circuit for the selected line unit to determine whether there are any calls directed to the selected line unit or originating at the selected line unit, for which a marker has been selected but for which the call has not been processed. In addition, a busy test on the line is made.

The marker activity check is made through a marker preference circuit 460 in the exchange to determine whether a marker is setting the particular line unit being selected for test. In the event the preference marker chain is found to be setting the line unit under selection, a signal indicating this condition is sent back through the controller to the CPU. The CPU then causes a delay of one second and then a recheck is instituted. If the marker indicates a busy condition, a verification procedure is instituted, as will be described further in detail herein. If there is no busy indication in the form of absence of ground on the marker preference circuits relay per line unit, testing may proceed on that line.

A busy check is also made in the form of search for ground on the sleeve of a line which indicates that the line is busy. Once the absence of ground is noted, then the connector places ground on the sleeve lead and reports back, the condition found.

If all four lines being tested at once are busy, no test is run on any one of the lines. If one line is busy, the other three are tested, and a count is maintained of the busy lines encountered. Under program control the apparatus operation can specify the option of busy line identification.

Once a test has been completed (the details of the actual testing will be described relative to the Test Circuit of FIG. 5), the test results are returned to the computer as four bits of information. The following steps occur during release of the selected lines. First the horizontal level is released on a signal from the computer through the controller. This action causes the test relays to restore and battery is dropped from the H lead. A check is instituted to determine that battery is no longer present on the H lead. The controller institutes a check of the location at which the testing is occurring to reset the controller to the next four lines.

A verification check is instituted through the connector in response to the following conditions:

1. If there is battery on the H lead at the start of the test end, thus no test call can be set in the line unit. Following this finding periodic checks are undertaken for a period of 3 minutes and if continued battery on the H lead, then a verification test is undertaken;
2. If the marker activity check indicates continued failure in the marker preference circuit for a period of 2 seconds;

3. If four consecutive lines being tested fail one or more tests;
4. Optionally a verification check may be made after testing of each frame group; and
5. A verification test is made before the start of a test of the exchange.

The test circuit of FIG. 5, performs three tests.

(a) Leakage to ground, (b) Leakage to battery, and (c) Leakage between conductors.

By interposing other test circuits, in place of certain of the test circuits of FIG. 5 measurement of traffic could be undertaken using the remainder of the apparatus previously described.

In the test circuit shown herein, we pre-condition a line in test to a known condition, test the line, detect the results and forward a fault condition found by the testing to the processor.

Figure 5A:
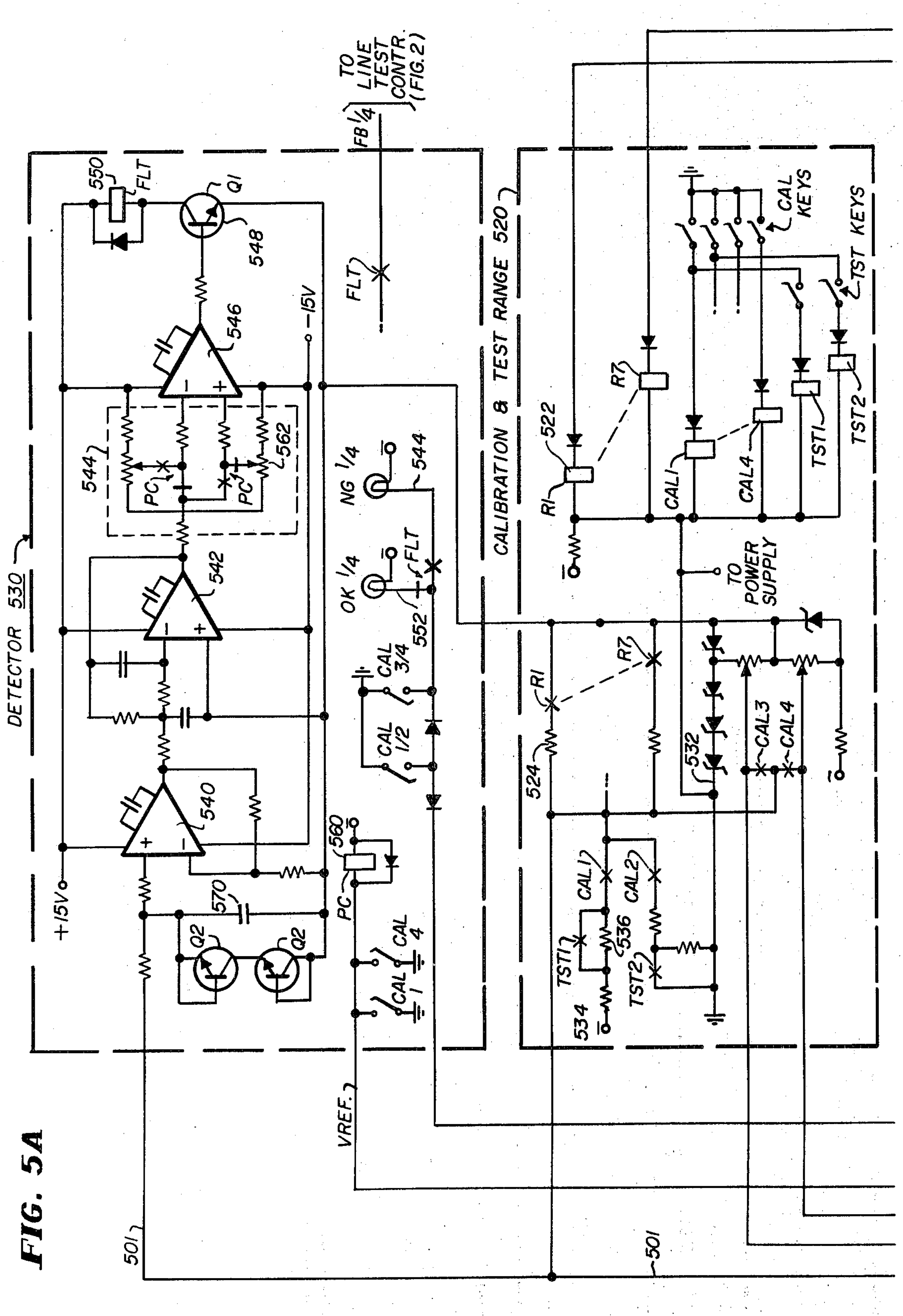
FIGS. 5A and 5B combinedly comprise a schematic circuit diagram of the test circuit of FIG. 1; with FIG. 5B being placed to the right of FIG. 5A.
Figure 5B:
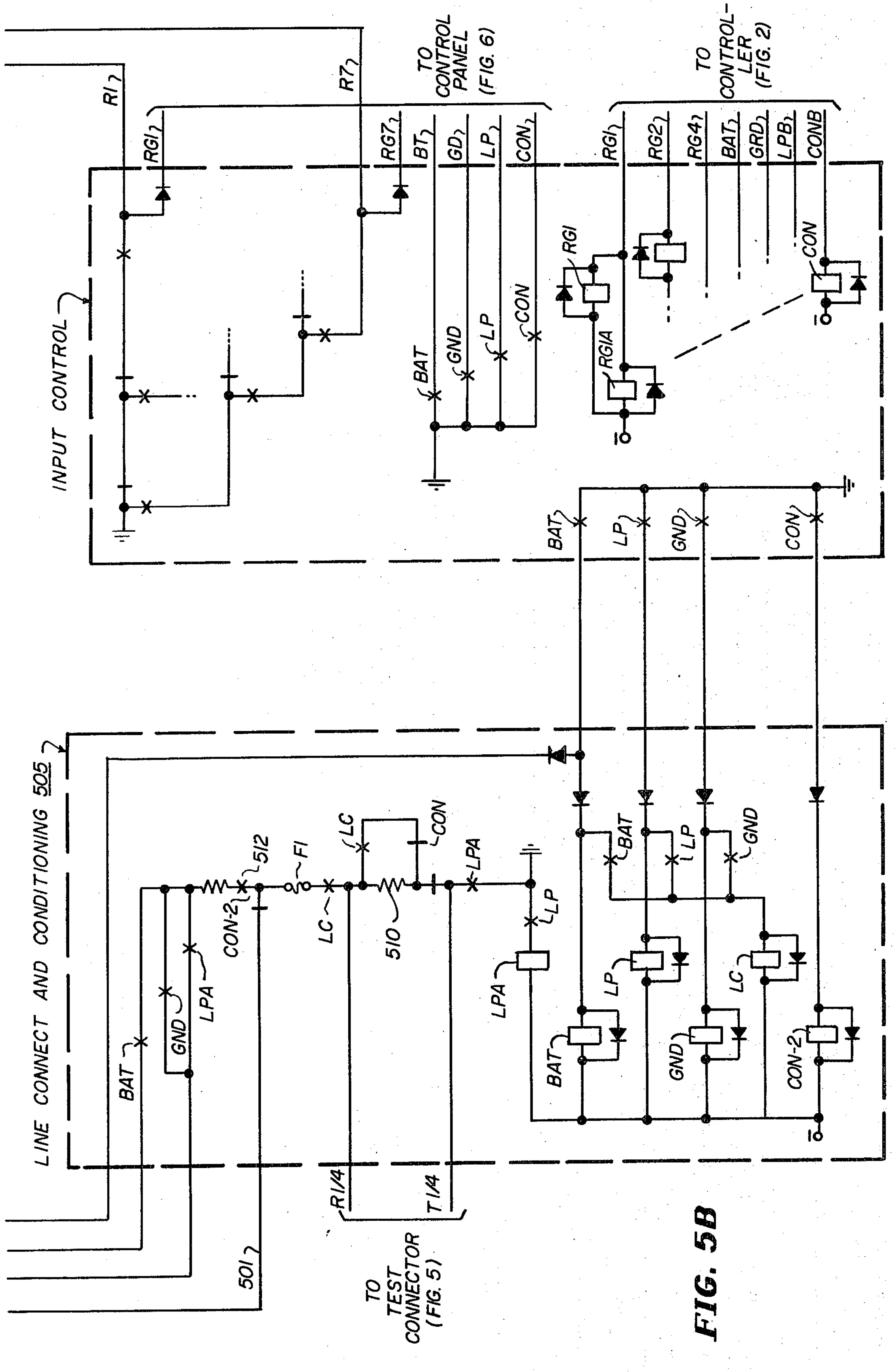

In FIG. 5B, we show the common testing and conditioning equipment comprising relays and their contacts. These relays act to pre-condition the loop to −24V and to set the resistance range of the test responsive to the setting forwarded from the processor. In FIG. 5A and in a portion of 5B, we show equipment which must be duplicated for each of the four lines under test at one time. Thus there are provided four detectors of the type shown in FIG. 5A, and four line connect and conditioning sections as shown in FIG. 5B.

The common equipment includes a battery test relay (BAT), a ground test relay (GND) and loop test relay (LP), each operable to institute a particular test, the relays being operated in sequence. A relay labelled CON is used to pre-condition the loop and four relays labelled RG1, RG1A, RG2, and RG4 are binarily associated to set one of the seven test resistance ranges.

In the individual circuits, such as those labelled Line Connect, there are slave relays for battery, ground and loop testing and pre-conditioning an LC relay which is operated in addition to any other operated relay in the circuit. This LC relay is a cut through relay for sequencing. These relays are slaves of the relays of the input control, four of the individual relays of one type being responsive to the operation of the similarly labelled relays in the individual Input Control circuits.

The seven possible resistance ranges at which testing may be instituted are indicated by the relays R1–R7 and the resistances R1–R7. One resistance range is selected for each test and tests are carried out in that range. Calibration is also accomplished by the relays of FIG. 5A.

The detector of FIG. 5A comprises a three operational amplifier detection network with the first two amplifiers being used respectively as a buffer and an active filter network to filter out any AC at 30 CPS 60 CPS in these two stages. The final stage comprises a differential amplifier at when the received signal is compared against either a positive standard of a negative standard (by the opening or closure of the PC contacts) with relay FLT operated responsive to a fault and indicate a fault condition by the closure of the FLT contacts.

As mentioned previously, a map of lines sure to fail (coin adaptors and PBX's) is maintained in the processor and the address of a line evincing a fault must be compared against the map to determine whether to print out the situation as a failure.

Recapitulating the operation of the test circuit of FIG. 5, the line connect and conditioning circuits 505 connect the tip and ring leads to either the detector circuit over input lead 501 or to the line conditioning circuit. The Controller 200 closes a relay contact operating the CON relay on the input control board which extends a ground to operate the CON–2 relay on this board. The Controller then selects a relay indicative of the type of test being run (BAT, GND, or Loop). When one of the test type relays operates, it extend the operate ground to relay LC through contacts of the operated test type relay. Relay LC in operating provides a shunt path around resistor R1, so that when the CON–2 relay releases, it extends the tip and ring lead connection through fuse F1, CON–2 contact–512, and the test type relay to the line conditioning voltage. After 60 milliseconds the Controller will release the CON – 1 relay releasing CON – 2 relay which connects the tip and leads together and connects them to the detector board on input lead 501. Resistor 512 slows down the charge or discharge of the line capacitance to reduce the tendency of the tuned ringer circuits to oscillate due to the charging current. The leakage to battery and to ground tests both connect the tip and ring leads together. Thus, if either conductor or the parallel combination of both is below the selected test limit, the line is indicated as failing. The leakage between conductors is checked by grounding the tip lead and connecting the ring lead to the detector to measure the impedance to ground. The calibrate and test range circuit 520 provides the required reference voltages and connects the test range resistor to the tip and ring leads. The miniature reed relays R1 through R7, (522 of Circuit 520) are operated from the one-out-of-seven decoder.

Each relay through its contacts 524 (designated R1–R7) connects one of the seven ranges of resistance to set the reference level of detector 530:

| RANGE | RELAY | RANGE |
|---|---|---|
| 1 | R1 | 15K |
| 2 | R2 | 25K |
| 3 | R3 | 50K |
| 4 | R4 | 100K |
| 5 | R5 | 250K |
| 6 | R6 | 500K |
| 7 | R7 | 1 MEG |

Zener diodes 532 (four 6.2 volt diodes connected in series) provide the detector reference voltage (−24.8V) with tap-offs to provide the line conditioning voltages (−18.6V and −31V). The calibration circuit provides a 100K resistance 534 in series with a 5K switchable resistor 536. The detector is adjusted to the failing condition on range 4 when only the 100K resistor is in the circuit and to the passing condition when the additional 5K resistance of resistor 536 is switched in.

The detector 530 is an electronic circuit which monitors the condition of the line during test and indicates whether the line meets or fails a given test. When a given test is started, the line is first conditioned for that test by the line connect and conditioning circuit 505, as previously discussed. Conditioning includes the steps of applying a voltage represents a failure level of voltage to the line for a period which is long enough to charge the line capacitance. Following the conditioning, the line voltage is given time to change. If the line leakage is low, the voltage on the line will drop to a non-failing level. The detector is then connected to the line, given time to respond, and then interrogated to check for a pass or fail condition. In discussing the detector circuit, it should be noted that the detector will indicate failure when the input voltage is about 1.73V or higher, and will indicate passage if the input voltage is below 1.73 volts.

The detector is powered by a power supply (not shown) which provides +15 VDC and −15 VDC with respect to the reference voltage V-REF which is about −24.8 VDC with respect to ground. When a line test fails on the battery leakage test, the input voltage will be −1.73 volts or more negative with respect to the reference voltage. On a loop test failure or leakage to ground failure, the input voltage will be +1.75 or higher with respect to the reference voltage. All of the electronic circuitry in the detector is referenced to the reference voltage rather than ground.

The detector may be considered to have a total of five stages, each having an active device, i.e. The triangular symbols, as is known, represent integrated circuit operational amplifiers. The A1 amplifier 540 having a gain of two, serves as an input buffer which presents a high impedance to the line circuitry on input and a low impedance to the A2 stage 542 which is a low pass filter with a cut off frequency of about 30 Hz. The stage 544 intermediate between A2 and A3 is also a low pass filter designed for a 60 Hz cut off frequency. The filtration is required to keep 60 Hz induction and other noise signals from affecting the test results.

The A3 stage 546 uses an operational amplifier A3, as a cross-over-zero detector. This stage performs the actual detection by comparison against the reference. The amplifier 546 has such an extremely high gain that when the input voltage difference between its inputs is slightly greater than zero, plus or minus, the output swings to its extreme end, plus or minus. To be more specific, the output voltage will normally be near −15 VDC. It will remain there during a line test which passes. However, if the input voltage reaches failure level the detector output will swing to +15 VDC which will cause Q1, (transistor 548) in the final stage to conduct heavily causing the operation of the FLT relay 550. The operated FLT relay transfers the output indication from pass on lead 552 to fail on lead 554 to NG.

The A3 stage 546 must respond to a negative voltage its input on battery leakage tests and a positive voltage at its input on loop or ground leakage tests to establish the proper polarity configuration of the A3 stage 546. With the PC relay 560 operated, the non-inverting or + input to amplifier A3 is biased negative forcing the output voltage to −15V. The potentiometer 562 is adjusted such that the A3 amplifier will switch when the signal input to reaches the failure threshold. When that threshold is reached, the input will be −1.73 with respect to the reference voltage. The output of the filter stage 544 will be =3.46 volts. The resulting voltage on amplifier A3 will be slightly more negative than the voltage on the plus input of amplifier 546. Amplification and inversion of amplifier A3 results in an output of nearly +15 volts. On occurrence of this condition, transistor Q1 conducts, relay FLT operates, and the system records the fault.

Transistor Q2 and Q3 are wired to serve as a protection circuit. Q2 will conduct when a negative signal at its base and collector connection exceeds the base to emitter breakdown voltage of Q2 which is about −10 volts. Under those conditions Q3 would be forward biased so the voltage at the collector of Q2 would be clamped at about 10V thus protecting the input to amplifier A1 from negative spikes. Q2 and Q3 provide the same protection from positive spikes except that their roles are reversed. Capacitor 570 is also provided for circuit protection. Other capacitors are provided in the circuit for protection from transient voltages.

Figure 6A:
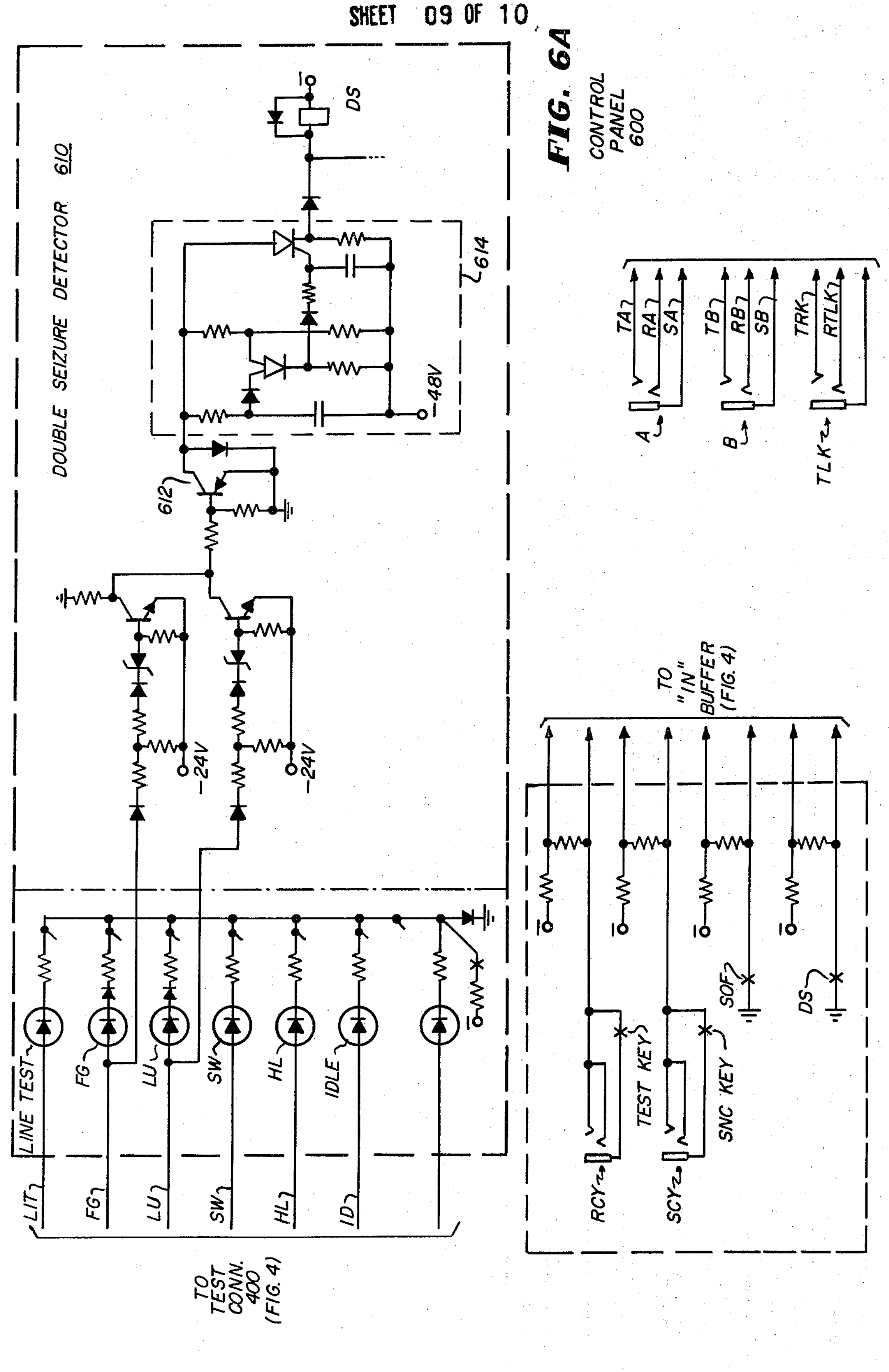
FIGS. 6A and 6B combinedly comprise schematic diagrams of the circuits of the Control Panel shown in FIG. 1.
Figure 6B:
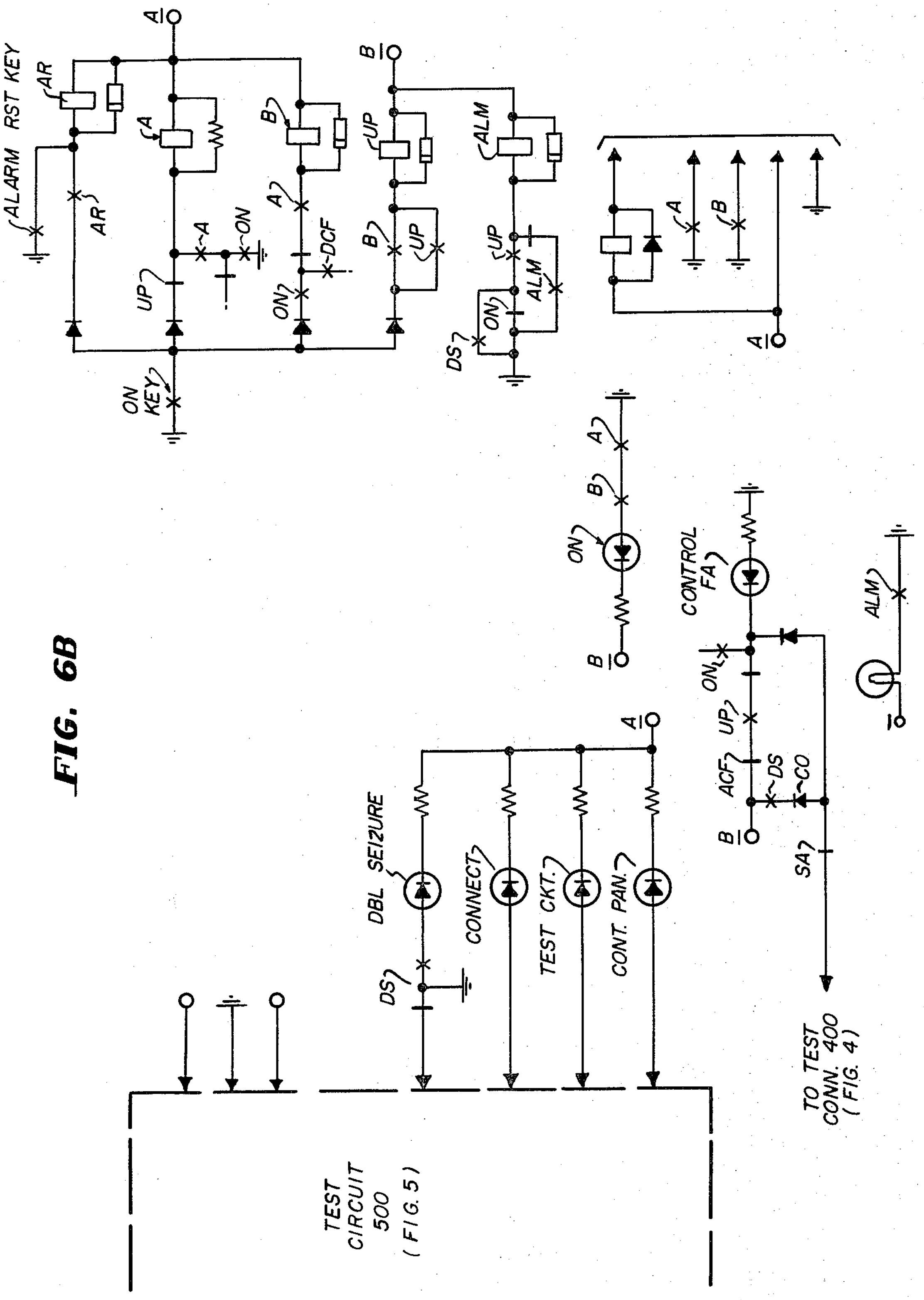

In FIG. 6, we show the control panel 600 with its indicator lights in the form of light emitting diodes (LED) to show which FG, LU, SW and HL units are being tested. Other lamps show various indications as necessary to the operation are provided but need not be described herein.

One feature of the circuit of FIG. 6A which should be noted is the double seizure detector 610. If any two of the FG relays 0–14 is operated or one FG relay and two LU relays 0–5 are operated, the double seizure is one which should be noted and acted upon. The preference scheme of the LU Connector/Marker access is destroyed by tieing the APSA leads together. The electronic circuit 610 for the FG-relays and LU-relays is provided to detect the double seizure and open the operate paths of the FG-relays by dropping the LT relay in the Line Test Connector of FIG. 4. The double seizure is also alarmed and a message is printed indicating which LU the system was attemping to access.

The key element in the double seizure detection process is the transistor 612 which only conducts when two or more inputs have received seizure indications from the test connector. If either two LU leads or two FG leads indicate seizure then transistor 612 is rendered conductive. A timing circuit 614 measures the period of continuance of this double seizure. Condition and conduction of transistor 612 for this period to cause DS relay 616 to operate. The results of this operation cause a trouble indication as indicated above. The time delay is inserted to prevent false alarm signalling due to operation of relay on either a too-slow or too-fast basis.

The operation of the apparatus of the present invention may be described as follows: To start a test sequence, the program controller or processor first clears the buffer registers in the controller circuit 200 then switches the controller to the line test mode. The program from the processor then encodes the starting frame group to a 1 out of 15 code and sends the data to the controller which buffers the computer output signals to operate the corresponding FG relay in the connector circuit. The starting line unit within the selected frame group is encoded to a 1 out of 6 code to operate the associated LU relay in the connector. The program next delays for 125 milliseconds, to allow the FG and LU relays to operate and extend battery to operate the LIT relay in the selected line unit. The line unit LIT relay cuts-through the required access leads and the four line circuits tip, ring and sleeve leads to the test system.

After 125 milliseconds, the processor selects one out of eight switches in the selected line unit. (The test sequence always starts with switch 0). The program again delays for 40 milliseconds to allow the SW relay to operate.

At this point, the apparatus has been connected to a line unit and before proceeding a check is made to determine that no normal call is in progress, and that no test calling is in progress. A no-test call is indicated by battery on the H lead. If the apparatus finds battery on the H lead, it waits for 3 minutes for the no-test call to be released. The H lead is checked every 10 seconds during this period and if the no-test call is released the apparatus continues to test. If the no-test is not released within 3 minutes, the apparatus advances to the next line unit and types a message indicating the line unit was skipped.

The apparatus could interfere with a normal call in two ways. First, it is possible the marker is terminating a call to one of the same four lines the apparatus is attempting to access. The marker prechecks the line for idle or busy and if found to be idle will set the switching network crosspoints to the line. The marker could have found the line idle and while setting the connection, the apparatus would gain access and ground the sleeve causing the marker to drop a trouble card. This condition is prevented by scanning the marker/line unit connector preference chain before accessing the lines. If this chain is open, indicating traffic activity in the selected line unit, the apparatus waits. A similar situation could occur on an originating call. The line goes off-hook and the line unit starts to connect a marker. Before a register is attached, the apparatus could ground the sleeve causing a trouble record. This condition is prevented by scanning the line unit/marker preference chain for a ground indicating traffic activity. Scanning these two preference chains is referred to as the marker check and is performed each time before the apparatus accesses a new group of lines. If the marker check indicates activity the apparatus waits for a maximum of 700 milliseconds, rechecking every 40 milliseconds until the marker check indicates an idle line unit.

After verifying that the line unit is idle, the processor selects the horizontal level and operates the associated HL relay in the connector. The HL relay extends battery to the line unit NT relay matrix operating the NT relay corresponding to the selected switch and horizontal level. The NT relay operates and extends its own operate battery to the H lead. This operating battery prevents the marker from setting a no-test call to this line unit and provides a signal to the system that the NT relay is operated. The apparatus waits a maximum of 200 millisecond to see if the battery signal is returned. If not returned in this time, the apparatus skips this horizontal level and types a message indicating this condition.

Once the NT relay operates, the apparatus is connected to the four line circuits on the horizontal level. The next task is to determine the status of the lines and ground the sleeve of the idle lines. Before performing this status check, a second marker check is made to verify that a normal call had not been started (originating or terminating) while the apparatus was waiting for battery on the H lead. If the line unit is active, the apparatus again waits. Once the line unit is idle, the processor sets the sleeve check bit.

The system connector 400 has a sleeve check circuit for each of the four lines. This check circuit is a high impedance probe which responds to a ground on the sleeve lead. The sleeve check bit supplies a control ground to the sleeve check circuit. If the line is idle, the sleeve check bit ground operates a mercury relay which switches ground to the sleeve lead making the line busy. If the line is busy, the sleeve check ground locks the busy relay, this busy relay lock prevents the line status from changing if the line goes idle during the test. The sleeve check circuit is designed to insure that the sleeve of idle lines is grounded within 5 milliseconds after sending the sleeve check bit (this time is typically 2 milliseconds) but the idle/busy status is not returned until a sufficient time has elapsed to allow relays of the type used in the exchange to operate. The program times 30 milliseconds after setting the sleeve check bit then reads the status of the four lines.

The four lines are now connected and the idle lines being tested are cut-through to the detector circuit. The processor now controls the insulation test circuit to test the four lines and store the results of each test for each line.

After testing the lines, the processor clears the sleeve check bit and the horizontal level (HL) relay. Releasing the HL relay releases the NT relay which removes battery from the H lead. The processor waits a maximum of 200 milliseconds for the battery to be removed. If the battery is not removed, indicating that the apparatus cannot release from the line unit, the system terminates the test sequence.

Normally the battery is removed indicating that the apparatus has released the four lines. The processor then checks the test results table to determine if any of the four lines failed any of the three tests. If so, the processor types the matrix location and the type of test which was failed. The test results are tabled. The table is checked after releasing the lines to reduce the length of time apparatus holds lines busy.

The processor now determines which lines to select next. If the level just checked was not the ninth level, the program selects the next horizontal level and starts the H lead and marker check. If the level just checked was the last level, the processor releases the switch. If not, the eighth and the last switch, the selection passes to the next switch and level zero. If the switch was the eighth switch, the processor releases the line unit. If not the last line unit in the frame group, the group selector passes to the next line unit at switch zero, and horizontal level zero. The same sequence follows for the frame group until the last line unit in the last frame group has been tested.

After the apparatus connector has accessed the horizontal level and cut-through the idle lines to the insulation test circuit, the line test subroutine is called. This subroutine or program selects the test range and sets the condition bit then delays for 2 milliseconds to allow the mercury relays in the test circuit to operate. The program next selects the test type-battery test first, then starts a 60 millisecond relay. During this 60 milliseconds, the insulation test circuit preconditions the line circuit. After the delay the processor clears the condition bit and starts a second 60 millisecond delay. The test circuit performs the insulation test during this delay period. The processor next interrogates the test circuit detectors to determine if the test was passed or failed. Next the test type is cleared, and the processor enters a 10 millisecond delay to allow the test circuit to stabilize. This entire procedure is repeated two more times changing the test type to ground test then to loop test last. After the loop test, the processor clears the test circuit and the program at control the processor is returned to main program which called for this subroutine.

As mentioned previously, by using traffic recording equipment in place of the test circuit 500, the basic principle and approach used herein could readily be adapted for traffic studies.

While there has been disclosed what is at present thought to be the preferred embodiment of the invention, it is understood that changes may be made therein and it is intended to cover in the appended claims all such modifications which fall within the spirit and scope of the invention.

We claim:

1. An apparatus for testing lines of a telecommunications exchange under the control of a program-controlled central processing unit, comprising means for addressing a plurality of lines to be tested at one time, means for setting said addressed plurality of lines into a test sequence, means responsive to a setting of said lines for returning to the processor an indication of the status of said lines, as available for test, testing means for each line of said plurality, means operative under the control of said processor for seizing said plurality of lines found to be available, means for initiating testing the seized lines of said plurality simultaneously for sequential tests for false ground, foreign battery and leakage of current between the leads of said lines, means for detecting failure of one or more of said lines to any one of said tests for providing a failing indication to the processing unit and means for registering the address of any line failing the tests.

2. An apparatus as claimed in claim 1, for an exchange in which the lines are grouped into a plurality of multiple-line groups, in which the lines to be tested simultaneously are all within the same line group, and means for checking to produce an alarm signal when lines in more than one group are set for test at one time.

3. An apparatus as claimed in claim 2, in which there are means responsive to completion of a test on one plurality of lines for initiating the setting of the next successive plurality of lines for test.

4. An apparatus as claimed in claim 2, wherein there are means for checking the exchange prior to the setting of lines for activity in the exchange directed toward seizing one of the lines for use, and means for preventing the setting for test of a line to which such activity is directed.

5. A line insulation test apparatus adapted to be controlled by a general purpose data processor for routining the lines of a common control telecommunications exchange, comprising: decoding means for decoding line addresses received from said processor for use by said apparatus, selecting means responsive to decoded line addresses for accessing a line group containing lines to be tested, means for testing the status of said group for an available condition, means responsive to the group found to be available for checking the common control to determine that addressed group to be tested is not being sought for a call, means responsive to a group being available and addressed group not being sought for thereafter checking the individual lines of the group to be tested for busy indications, means responsive to one line of said addressed lines providing a busy indication for producing a busy indication for that line for the pendency of a testing period, means for connecting idle ones of said plurality of lines to an insulation testing network, said network including a detector circuit for each line being tested, said detector circuits being rendered operative on said network connection to initiate testing of the lines connected thereto for said test period, and means responsive to any line being tested failing the test for transmitting the address of said line to said processor for registration.

6. An apparatus as claimed in claim 5, wherein said common control includes a marker for processing calls through the exchange, and said common control checking means comprises a scanner for checking said marker for activity, and in which there is means for performing a second marker activity check prior to said connection of said lines to said detector.

7. An apparatus for automatically testing the lines of a telecommunications exchange under the program control of a general purpose computer, the invention comprising a controller circuit for interfacing said computer with testing circuits, said controller circuits receptive of addresses of lines to be tested from said computer for decoding said addresses for use by a test controller and for returning the status of addressed lines to said computer in coded form suitable for said computer, a test connector operative to select lines for testing according to addresses received from said controller circuits, and a plurality of testing circuits for simultaneously performing a series of insulation tests on said plurality of addressed lines, means for providing indications of results of said tests from said testing circuits to said controller circuits for decoding and transmission to said computer, and an automatic means connected to said controller for providing visual read-out of test results.

8. An apparatus as claimed in claim 7 in which the lines of said exchange are grouped into line groups, and in which there is a test relay for plural lines in each group, and line select means in said controller for checking the test relay lines to be tested, and in which there are markers for completing calls to and from lines of said exchange, and means in said test connector for checking the marker unit to determine if a call to lines of a group being addressed are active in a call.

9. An apparatus as claimed in claim 8, wherein said test connector seizes the test relay representing lines to be tested responsive to an idle test on said relay indicating said test relay is idle prior to checking the marker for the lines being tested.

* * * * *